May 3, 1966 S. PAKSWER ETAL 3,249,853
NEGATIVE RESISTANCE DEVICES
Filed March 18, 1963

INVENTORS
Serge Pakswer
Krishna T. Pratinidhi
By John J. Pederson
Atty.

United States Patent Office 3,249,853

Patented May 3, 1966

3,249,853

NEGATIVE RESISTANCE DEVICES

Serge Pakswer, Elmhurst, and Krishna T. Pratinidhi, Chicago, Ill., assignors to The Rauland Corporation, Chicago, Ill., a corporation of Illinois Filed Mar. 18, 1963, Ser. No. 265,910
1 Claim. (Cl. 323—98)

The invention relates to a novel bidirectional electric switching circuit which includes an active circuit element exhibiting a bidirectional negative resistance characteristic.

It is well known in the art that devices exhibiting negative resistance characteristics such as gas tubes, multilayer semiconductor diodes, so-called Esaki-diodes, thyratrons and solid state controlled rectifiers have a wide use as circuit elements in many fields including the generation of oscillations, phase inversion, and electronic switching. In some of these devices, the negative resistance characteristic is attributed to multiplication of carriers due to an ionization of particles by various means such as the application of a large electric field, or collision with fast particles, while in others, the effect is produced by tunneling electrons through thin insulating layers in electric fields of particular configuration.

Some of the known negative resistance devices afford current-voltage characteristics which are particularly adapted for switching application, but in general, such known devices require no less than three electrode connections. Moreover, many of the known switching devices such as gas thyratrons are unilateral switching devices and unsuited for use in bilateral applications.

A principal object of this invention is to provide a new and improved bidirectional switching circuit which includes a bidirectional negative resistance device consisting of simple elements and adapted for mass production at very low cost.

It is a further object of this invention to provide a bidirectional switching circuit utilizing an improved negative resistance device which can be made of very small size and is therefore especially useful in miniaturization of electronic circuits.

According to the invention, a new bidirectional switching apparatus comprises a device exhibiting a negative resistance characteristic and including a metal electrode, an insulating coating on at least a portion of the metal electrode, a counter-electrode comprising mercury in contact with the insulating coating, an alternating voltage source coupled between the metal electrode and the counter-electrode, and a load impedance coupled between one of the electrodes and the alternating source.

Figure 1:
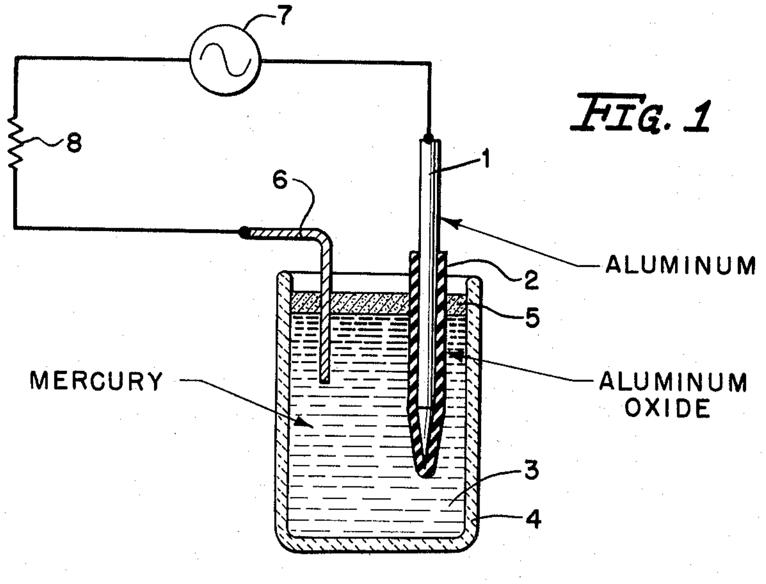

The invention together with further objects and advantages thereof may best be understood by reference to the following description taken in connection with the following drawings, in which:

FIGURE 1 is a cross-sectional view of a bidirectional switching apparatus constructed in accordance with the invention.

Figure 3:
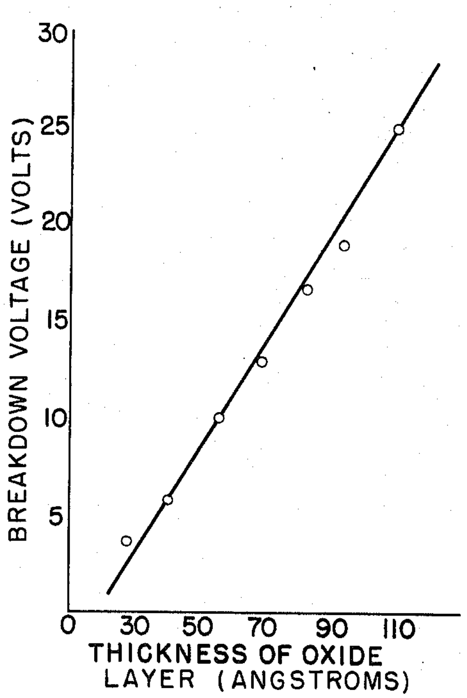
Figure 2:
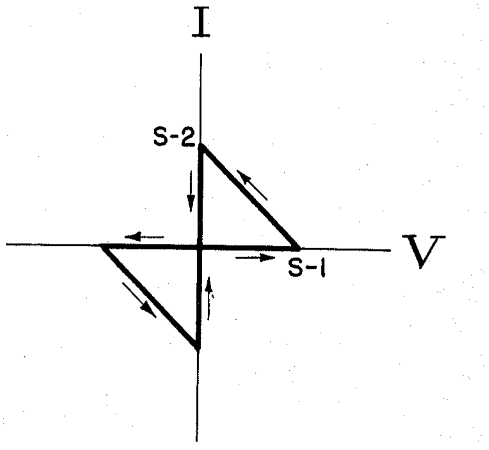

FIGURE 2 is a graphical representation of the current-voltage characteristic of the bidirectional negative resistance device of FIGURE 1; and FIGURE 3 is a graph showing the relation between the thickness in Angstroms of the insulating coating 2 of the device of FIGURE 1 and the voltage at which the device changes from a low current-high voltage mode of operation to a low voltage-high current mode.

Apparatus constructed in accordance with the invention and exhibiting a bidirectional switching characteristic is depicted in FIGURE 1. In FIGURE 1, a metal electrode 1, preferably of wire shape, is coated at one end with a layer of insulating material 2; the coated portion of electrode 1 is immersed in mercury 3, contained in a glass or ceramic enclosure 4, and sealed by a cover 5 of paraffin, epoxy resin or the like. A conductive lead or terminal 6, which may be of carbon or platinum, extending through cover 5 is immersed in mercury 3; alternatively, enclosure 4 may be made of conducting material such as copper or stainless steel and lead 6 may be connected to enclosure 4 or, if electrical connection is made to enclosure 4, dispensed with entirely.

In an exemplary embodiment of this invention, the metal element 1 may be made of commercial grade aluminum .013 inch in diameter. The part of this element to be covered with an insulating layer is approximately 0.1 inch long. This aluminum wire is cleaned with a diluted aqueous sodium hydroxide solution and immersed into an aqueous anodizing solution of 1% ammonium citrate and 0.5% citric acid. For anodizing, as known in the art, the aluminum wire is connected to the positive pole of a battery or other D.C. power supply (not shown) and located in the electrolyte opposite another electrode made of carbon, platinum or any other suitable material which is connected to the negative terminal of the power supply. A voltage of a magnitude between 1 and 10 volts, depending on the desired thickness of insulating coating 2, is applied to this assembly and maintained until the initial high current has decayed to a low value, indicating that the immersed portion of the aluminum wire is covered with a layer of anodic aluminum oxide of predetermined thickness. As is known in the art, an oxide layer of 13.7 Angstrom units in thickness is obtained for every volt applied between these terminals.

When the anodized wire is immersed into a mercury pool to a depth no greater than the length of insulating coating 2, and the mercury is connected over a voltage-dropping resistance 8 to one terminal of a 60-cycle A.C. power source 7, a current-voltage characteristic as shown in FIGURE 2 is obtained if the other terminal of source 7 is connected to metal core 1.

As the A.C. voltage is increased in the positive quadrant, that is with the instantaneously positive pole of power supply 7 in the mercury, no apparent current increase occurs until a saddle point S–1 in FIGURE 2 is reached. When the voltage instantaneously exceeds a threshold dependent on the thickness of insulating layer 2, the current suddenly increases and the voltage decreases to a saddle point S–2 in FIGURE 2, displaying a negative-resistance switching characteristic. As the instantaneous A.C. voltage output from source 7 reaches its zero value, the current rapidly decreases along the axis of ordinates to the point of origin in the trace, and as the instantaneous voltage changes to the opposite polarity, the phenomenon repeats itself completely in the lower left quadrant, in symmetry with the trace in the upper right quadrant during the positive half-cycle. The magnitude of the saddle point S-1 is determined solely by the thickness of insulating layer 2, and the measured value of S–1 is plotted as a function of this thickness in FIGURE 3, for the device illustrated in FIGURE 1. It can be seen that all points fall substantially on a straight line indicating that the value of field strength is constant and equal to approximately $3 \times 10^7$ volts per centimeter. The value of the peak current corresponding to saddle point S–2 is determined by the amount of external resistance in the circuit; stable operation has been obtained with oxide coatings of a thickness ranging from 20 to 150 Angstroms and with currents of 100 microamperes and more.

At present, the reasons for the observed phenomenon in a bidirectional negative resistance device of the described construction are not fully understood. It is not believed that the achievement of the switching characteristic of FIGURE 2 is caused by the so-called tunneling effect through the thin oxide layer, because the shape of the obtained voltage-current characteristic does not resemble the S-shaped curve generally obtained with tunneling devices. It is suspected that in the device employed in the switching apparatus of the invention, there occurs some type of avalanche multiplication by field ionization. In any event, the switching characteristic of FIGURE 2 is both stable and readily reproducible.

It will be apparent to persons skilled in the art that a device having a current-voltage characteristic of the type shown in FIGURE 2 is capable of performing most operations or functions achieved with negative resistance devices. Moreover, because of the complete symmetry of the switching characteristic of FIGURE 2, the negative resistance diode circuit of the present invention may be employed to replace substantially more complex triodes and multiple electrode device circuits heretofore required for bidirectional switching.

While a particular embodiment of the present invention has been shown and described, it is apparent that various changes and modifications may be made, and it is therefore intended in the following claim to cover all such modifications and changes as may fall within the true spirit and scope of this invention.

We claim:

Bidirectional switching apparatus comprising: a device exhibiting a negative resistance characteristic in response to an applied voltage exceeding a predetermined magnitude and including a metal electrode, a coating of insulating material on at least a portion of said metal electrode, and a counter-electrode comprising mercury contacting said insulating coating; a source of an alternating voltage of a peak amplitude greater than said predetermined magnitude coupled between said metal electrode and said counter-electrode; and a load impedance coupled between one of said electrodes and said alternating source.

References Cited by the Examiner

UNITED STATES PATENTS

| | | | |
|---|---|---|---|
| 2,740,028 | 3/1956 | Buckman | 338—156 |
| 2,786,120 | 3/1957 | La Point | 200—152.9 |

LLOYD McCOLLUM, *Primary Examiner.*

RICHARD M. WOOD, *Examiner.*

A. D. PELLINEN, H. T. POWELL, *Assistant Examiners.*